United States Patent [19]
Burke et al.

[11] Patent Number: 5,813,335
[45] Date of Patent: Sep. 29, 1998

[54] APPARATUS FOR PREVENTING BACKLASH BETWEEN THE MESHING TEETH OF A FIRST AND A SECOND GEAR IN A PRINTING UNIT OF A LITHOGRAPHIC ROTARY PRINTING PRESS

[75] Inventors: David Charles Burke, Portsmouth; Richard Edward Breton, Rochester, both of N.H.

[73] Assignees: Heidelberg Harris Inc., Dover, N.H.; Heidelberger Druckmaschinen AG, Heidelberg, Germany

[21] Appl. No.: 769,055

[22] Filed: Dec. 18, 1996

[51] Int. Cl.[6] ........................................... B41F 7/02
[52] U.S. Cl. ........................... 101/217; 101/177; 74/409; 74/440
[58] Field of Search ................................. 101/177, 183, 101/181, 212, 216, 219, 248, 217; 74/409, 440

[56] References Cited

U.S. PATENT DOCUMENTS

| | | | |
|---|---|---|---|
| 3,407,727 | 10/1968 | Fischer | 101/177 |
| 4,602,523 | 7/1986 | Kurata et al. | 74/409 |
| 4,781,073 | 11/1988 | Bondhus et al. | 74/409 |
| 5,067,364 | 11/1991 | Januszewski | 74/409 |
| 5,357,858 | 10/1994 | Guaraldi et al. | 101/216 |

OTHER PUBLICATIONS

"Design and Application of Small Standardized Components" Data Book 757, pp. 282–289.

*Primary Examiner*—Ren Yan
*Attorney, Agent, or Firm*—Burns, Doane, Swecker and Mathis, L.L.P.

[57] ABSTRACT

Apparatus for preventing backlash between a first gear and a second gear of a gear train. Exemplary embodiments include a supplementary gear rotatably mounted adjacent to the first gear and rotatable about the same rotational axis as the first gear, the teeth of the supplementary gear being in meshing engagement with the teeth of the second gear. The apparatus further includes a support element formed on at least one of the first gear and the supplementary gear, and a leaf spring assembly extending essentially radially with respect to the rotational axis of the first gear. The leaf spring assembly is bent out of its zero-position and engages the support element at its second end portion, thereby applying a force to the support element for biasing the supplementary gear and the first gear to rotate in opposite directions.

17 Claims, 6 Drawing Sheets

APPARATUS FOR PREVENTING BACKLASH BETWEEN THE MESHING TEETH OF A FIRST AND A SECOND GEAR IN A PRINTING UNIT OF A LITHOGRAPHIC ROTARY PRINTING PRESS

BACKGROUND OF THE INVENTION

1. Field of the Invention

The present invention relates to an apparatus for preventing backlash between the meshing teeth of a first and a second gear, such as the meshing teeth of a plate cylinder gear and a corresponding blanket cylinder gear in a printing unit of a lithographic rotary printing press.

2. State of the Art

The gear teeth that mesh between a first gear and a corresponding second gear, such as between a driving gear and a driven gear of a gear train, usually tend to separate circumferentially when the gears rotate at very high speeds. Thus, the gear teeth on a driving gear which is fixed to a blanket cylinder in a printing unit of a rotary printing press tend to separate circumferentially from the gear teeth on a driven gear, which is fixed to an adjoining plate cylinder of the printing unit, when the cylinders rotate at very high speeds. The circumferential separation between the teeth usually results in registering errors which lead to a so-called "doubling" of the printed dots, severely affecting the quality of the printed product, particularly in a lithographic printing press.

Another problem which occurs is that the separation between the gear teeth of a driving gear and a corresponding driven gear can result in gear swinging which, in the case of the aforementioned plate cylinder and blanket cylinder gears of a printing unit, can also detrimentally affect printing quality.

U.S. Pat. No. 5,357,858 discloses an apparatus for preventing circumferential separation of the meshing teeth of a blanket cylinder gear and a plate cylinder gear, wherein a first gear has gear teeth in meshing engagement with the gear teeth of the blanket cylinder gear. The first gear is rotatable about an axis. A second gear is coaxial with the first gear and is rotatable about the same axis relative to the first gear. A third gear has gear teeth in meshing engagement with the gear teeth of the second gear. A fourth gear is coaxial and rotatable with the plate cylinder gear and has gear teeth in meshing engagement with the gear teeth on the third gear. The apparatus further includes a resilient pre-loaded, commonly wound torsion spring, which drivingly connects the first gear and the second gear, via a shaft fixedly connected to the first gear and extending through a hole in the center of the second gear along the axis of rotation of the first and second gears. The first and second gears are thereby biased about their common axis of rotation in respective directions that are opposite to each other. Since the torque, which is applied to the shaft by the pre-loaded torsion spring, results in a radial force acting on the shaft at the position where the end of the torsion spring is connected to the shaft, the supporting bearings of the shaft are highly loaded, resulting in increased wear of the bearings and other components. Such a configuration is likely to cause bearing failures. In addition, the apparatus is relatively large in size and comprises a large number of single parts, thereby increasing the cost of the apparatus and also increasing the danger of working failures.

U.S. Pat. No. 3,407,727 discloses an apparatus for preventing backlash between the meshing teeth of a first gear and a second gear mounted to a plate and a blanket cylinder in a rotary printing press, which comprises a supplementary gear mounted coaxial with the first gear, whereby the teeth of the supplementary gear and the first gear are in meshing engagement with the second gear. The supplementary gear and the first gear are biased to rotate in opposite directions by a coil spring, which is arranged in a recess formed in the supplementary gear and which rests with its first end at the supplementary gear and with its second end at a screw mechanism fixedly mounted at an adjoining outer surface of the first gear. In order to vary the force biasing the supplementary gear and the first gear into opposite directions, and to prevent backlash between the two gears, the spring force of the compression coil spring can be altered via the screw-mechanism. Owing to the large recess in the supplementary gear, which is required in order to provide for a coil spring with a sufficient biasing force, the supplementary gear comprises a reduced stability in the portion where the recess is formed. In addition, the maximum force which can be provided by the compression coil spring is low in that it is not sufficient to safely prevent backlash between the corresponding plate cylinder and blanket cylinder gears used in typical printing presses running at speeds of, for example, a hundred thousand revolutions or more per hour.

SUMMARY OF THE INVENTION

It is an object of the present invention to provide an apparatus for preventing backlash between the teeth of two meshing gears, such as the teeth of a blanket cylinder gear and a corresponding plate cylinder gear in a printing unit of a lithographic rotary printing press. Exemplary embodiments are simple in construction, including only a few additional elements which can be easily retrofit to currently used gears or gear trains. Further, exemplary embodiments provide a biasing force that safely prevents backlash between the two gears even at very high speeds. It is a further object of the present invention to provide an anti-backlash apparatus which provides for easy variation of the biasing forces in order to adapt the apparatus to different kinds of gears working under different kind of conditions, and which is easily adaptable to different kinds of printing presses.

According to exemplary embodiments of the present invention, even when distances between the centers of the gears in the rotary printing press change (e.g., distance between centers of the plate cylinder gear and the blanket cylinder gear), exemplary embodiments generate forces which cause two gears (e.g., a supplementary gear and a plate cylinder gear) to rotate in opposite directions, and thereby eliminate any backlash or gap which would otherwise result. Such a feature is in contrast to conventional rotary printing presses, wherein static anti-backlash gears address only a fixed gap between the centers of meshing gears, and which do not account for variations in distances between gear centers.

According to an exemplary embodiment of the invention, an apparatus for preventing backlash between the meshing teeth of a first and a second gear, such as the meshing teeth of a plate cylinder gear and a corresponding blanket cylinder gear in a printing unit of a lithographic rotary printing press, comprises a supplementary gear rotatably mounted adjacent to the first gear and rotatable about a rotational axis of the first gear, teeth of the supplementary gear being in meshing engagement with teeth of the second gear. A support element is fixedly mounted with respect to at least one of the first gear and the supplementary gear. A leaf spring assembly has a first end portion extending essentially radially with respect to the rotational axis of the first gear, a second end portion of the leaf spring assembly being bent out of its zero-position and engaging the support element to apply a force to the support element which biases the supplementary gear and the first gear to rotate in opposite directions.

According to another exemplary embodiment, the support element is formed by a pin projecting sidewardly from at least one of the first gear and the supplementary gear. The leaf spring assembly is, for example, arranged outside of the supplementary gear. Pursuant to a further exemplary embodiment of the invention, the second end of the leaf spring assembly extends into a recess formed in at least one of the first gear and the supplementary gear, and the support element is formed at the sidewall of the recess.

The first gear comprises, for example, a sleeve-shaped coaxial projection extending through a central recess formed in the supplementary gear, the inner diameter of the central recess and the outer diameter of the sleeve-shaped coaxial projection being such that the supplementary gear is rotatably supported on the sleeve-shaped coaxial projection and is radially immovable with respect to the rotational axis of the first gear.

In addition, in an exemplary embodiment of the invention, a radially extending recess can be formed in at least one of the supplementary gear and the sleeve-shaped coaxial projection of the first gear for receiving the first end portion of the leaf spring assembly.

Furthermore, the leaf spring assembly can be radially secured in the radially extending recess by a pin or bolt extending through respective holes. For example, the holes can be formed in the sleeve-shaped coaxial projection and the first end portion of the leaf spring assembly.

According to another embodiment of the invention, the leaf spring assembly is axially secured in the radially extending recess by a bracket.

Pursuant to a further embodiment, the sleeve shaped projection is mounted to the first gear by means of bolts.

In an exemplary embodiment of the invention, a further pin is provided at the first gear extending from the sidewall of the first gear into a further recess formed in the supplementary gear for preventing free rotation of the supplementary gear, in the event that the meshing engagement between the supplementary gear and the second gear is interrupted. In this embodiment, the further recess of the supplementary gear can include an elliptical shape and the leaf spring assembly can include two or more single leaf springs fixedly mounted together at the first end portion.

BRIEF DESCRIPTION OF THE DRAWINGS

The present invention, together with additional objects and advantages thereof, will be best understood from the following description of exemplary embodiments when read in connection with the accompanying drawings, in which.

DETAILED DESCRIPTION OF THE PREFERRED EMBODIMENTS

Figure 1:
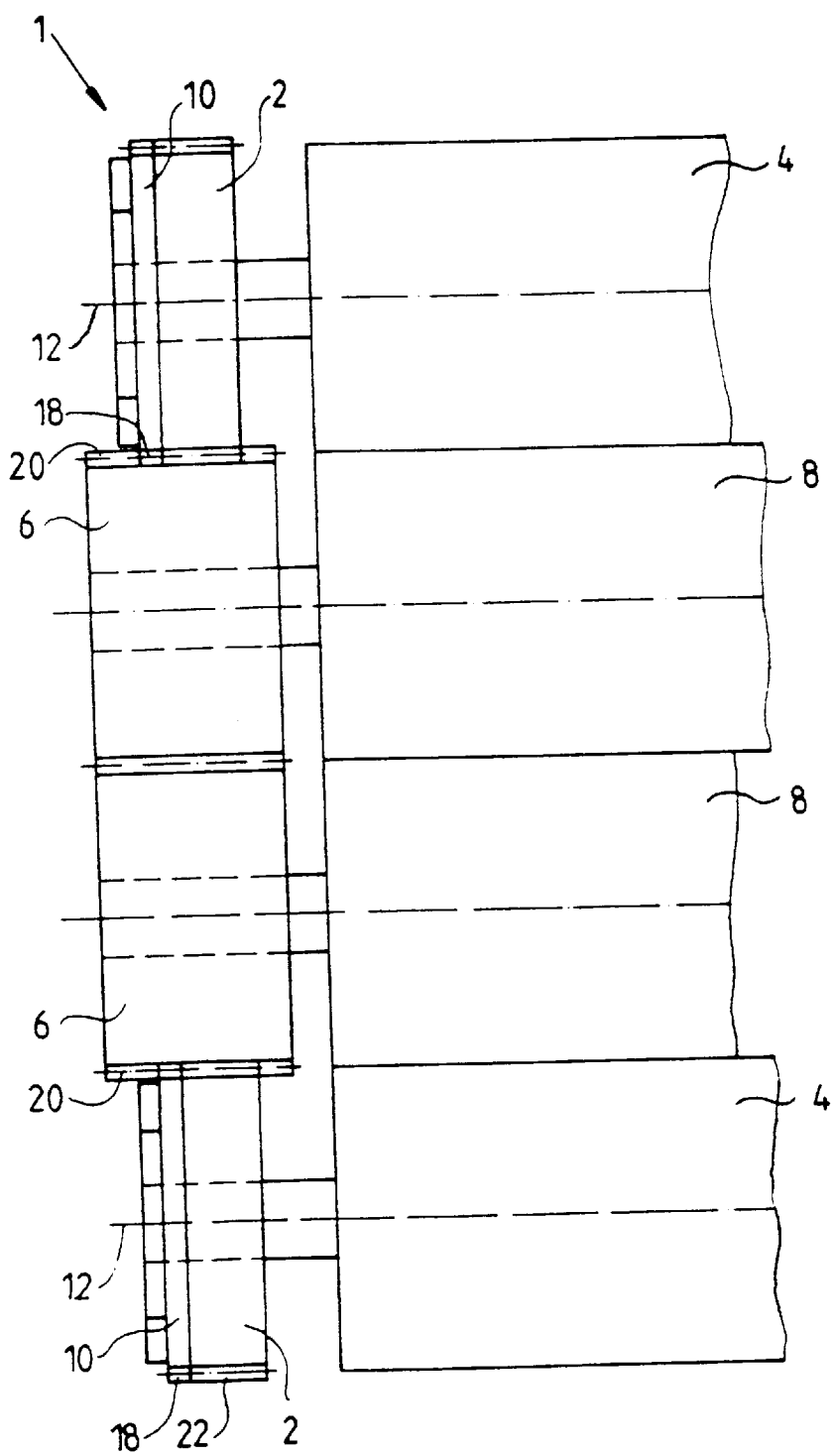
FIG. 1 shows a schematic cross sectional view of a gear train of plate and blanket cylinder gears in a lithographic rotary printing press in which the drive gears of two plate cylinders comprise an anti-backlash apparatus according to the present invention.

An exemplary apparatus 1 for preventing backlash between the meshing teeth of a first gear and a second gear, such as the drive gear 2 of a plate cylinder 4 and the drive gear 6 of an associated adjoining blanket cylinder 8 of a printing unit, is schematically shown in FIG. 1. The FIG. 1 apparatus comprises a supplementary gear 10 which is mounted adjacent to the first gear 2.

Figure 2:
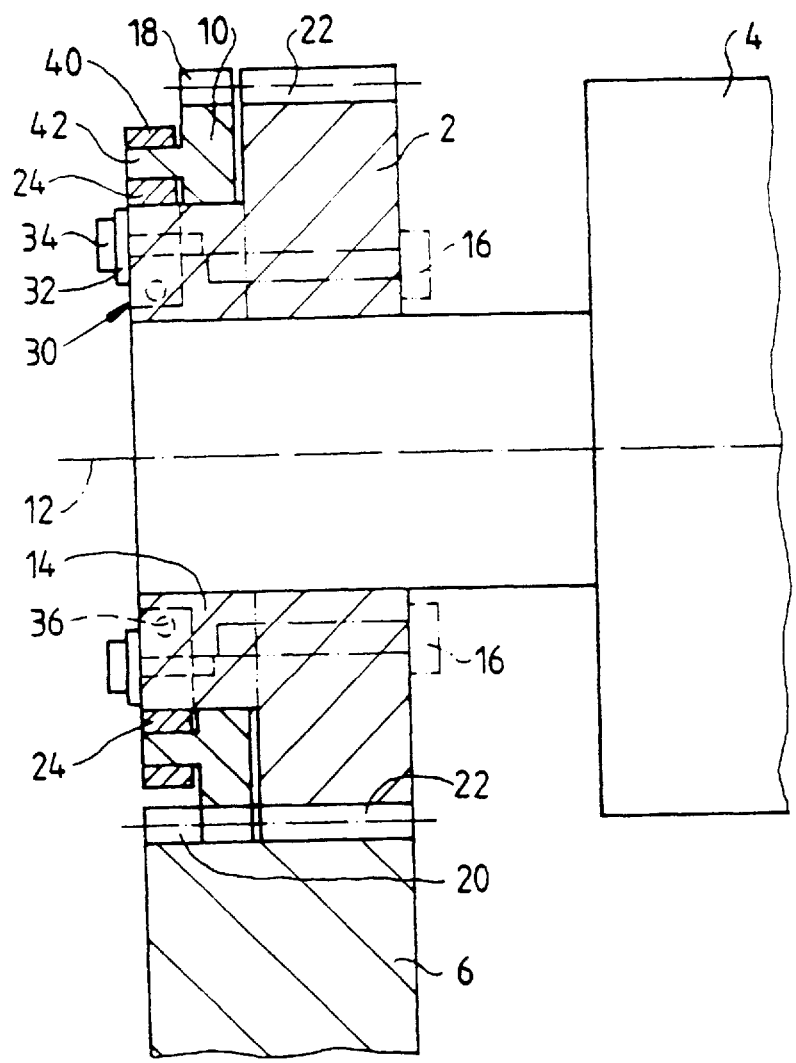
FIG. 2 shows an enlarged cross sectional view of an anti-backlash apparatus used, for example, in the gear train of FIG. 1.
Figure 3A:
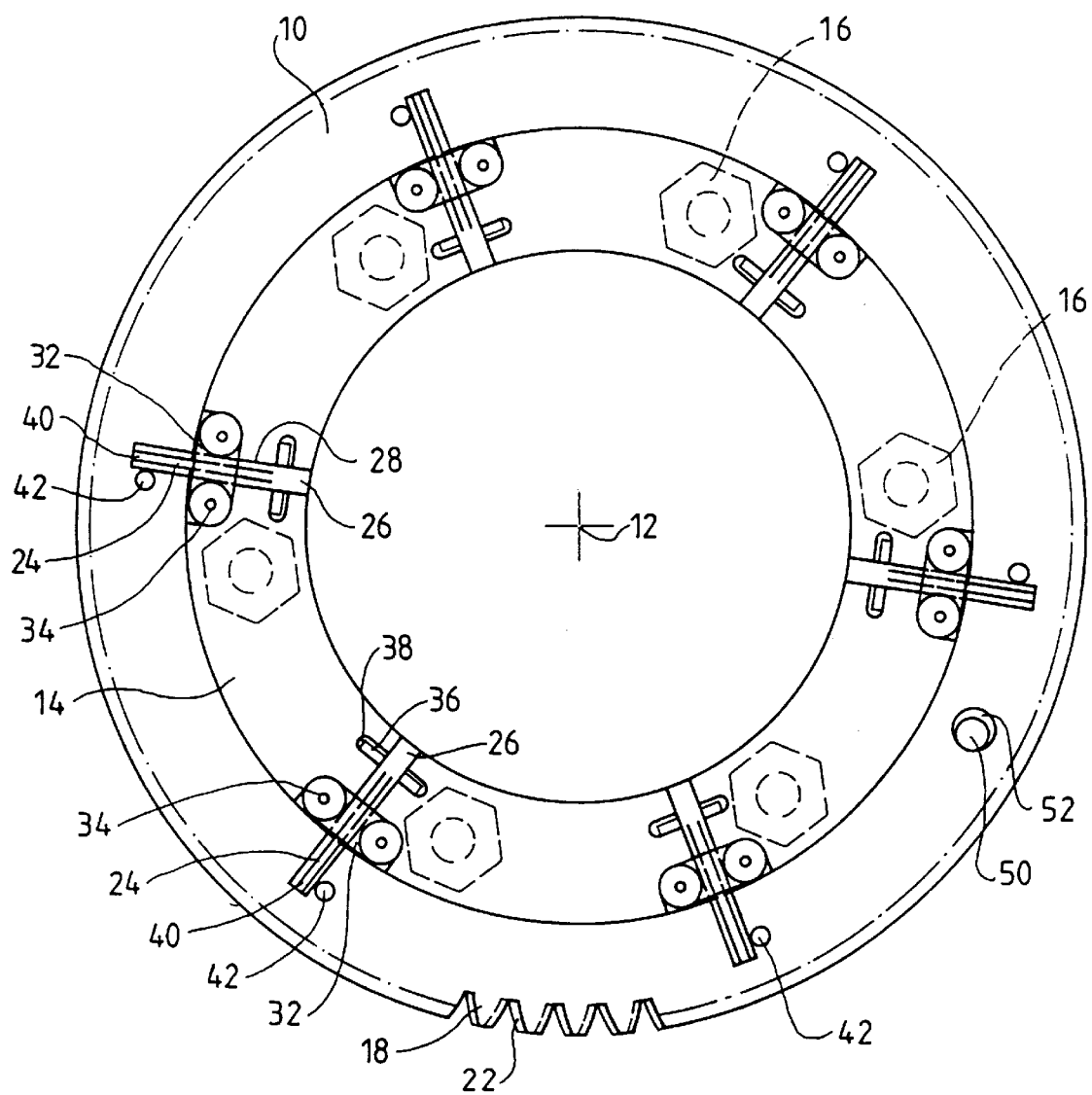
FIGS. 3A and 3B show schematic front views of the anti-backlash apparatus of FIG. 2.

As shown in detail in FIGS. 2 and 3A, the supplementary gear 10 is rotatable about the same rotational axis 12 as the first gear 2. In an exemplary embodiment of the invention, the supplementary gear 10 is mounted on a sleeve-shaped coaxial projection 14 which can, for example, be formed as an integral part of the body of the first gear 2, or can be mounted to the body of the first gear 2 by means of, for example, bolts or screws 16.

The supplementary gear 10 can be ring-shaped, whereby the central recess formed in the supplementary gear 10 has an inner diameter which is slightly larger than the outer diameter of the sleeve-shaped projection 14. Thus, the supplementary gear 10 is on the one hand rotatably supported on the sleeve-shaped projection 14, but is on the other hand radially immovable with respect to the rotational axis 12 of the first gear 2.

In an alternate embodiment, rather than mounting the supplementary gear in the above-described way, it can also be rotatably supported on, for example, rollers (such as three or more rollers), pins or projecting portions mounted to the body of the first gear 2 instead of the sleeve-shaped projection 14, such that the supplementary gear 10 is radially not movable, but is coaxially rotatably supported with respect to the first gear 2.

As shown in FIGS. 1, 2 and 3, the supplementary gear 10 comprises gear teeth 18, which are in meshing engagement with the teeth 20 of the second gear 6. In other words, the supplementary gear 10 and the first gear 2 are mounted in parallel such that the teeth 18 of the supplementary gear 10 and the teeth 22 of the first gear 2 are both in meshing engagement with the teeth 20 of the second gear 6.

A leaf spring assembly 24 is drivingly connected with its first end portion 26 mounted at a first location. In an exemplary embodiment of the invention shown in FIGS. 2, 3A and 4, the first end portion 26 of the leaf spring assembly 24 is received in a substantially radially extending recess 28 formed in the body of the sleeve-shaped projection 14. In this embodiment of the invention, the sleeve-shaped projection 14 can be arranged axially beside the supplementary gear 10. In other words, the position where the recess 28 is formed in the sleeve-shaped projection 14 can be in a portion of the sleeve-shaped projection 14 which is located axially beside the portion of the sleeve-shaped projection 14 on which the supplementary gear 10 is rotatably supported.

Figure 3B:
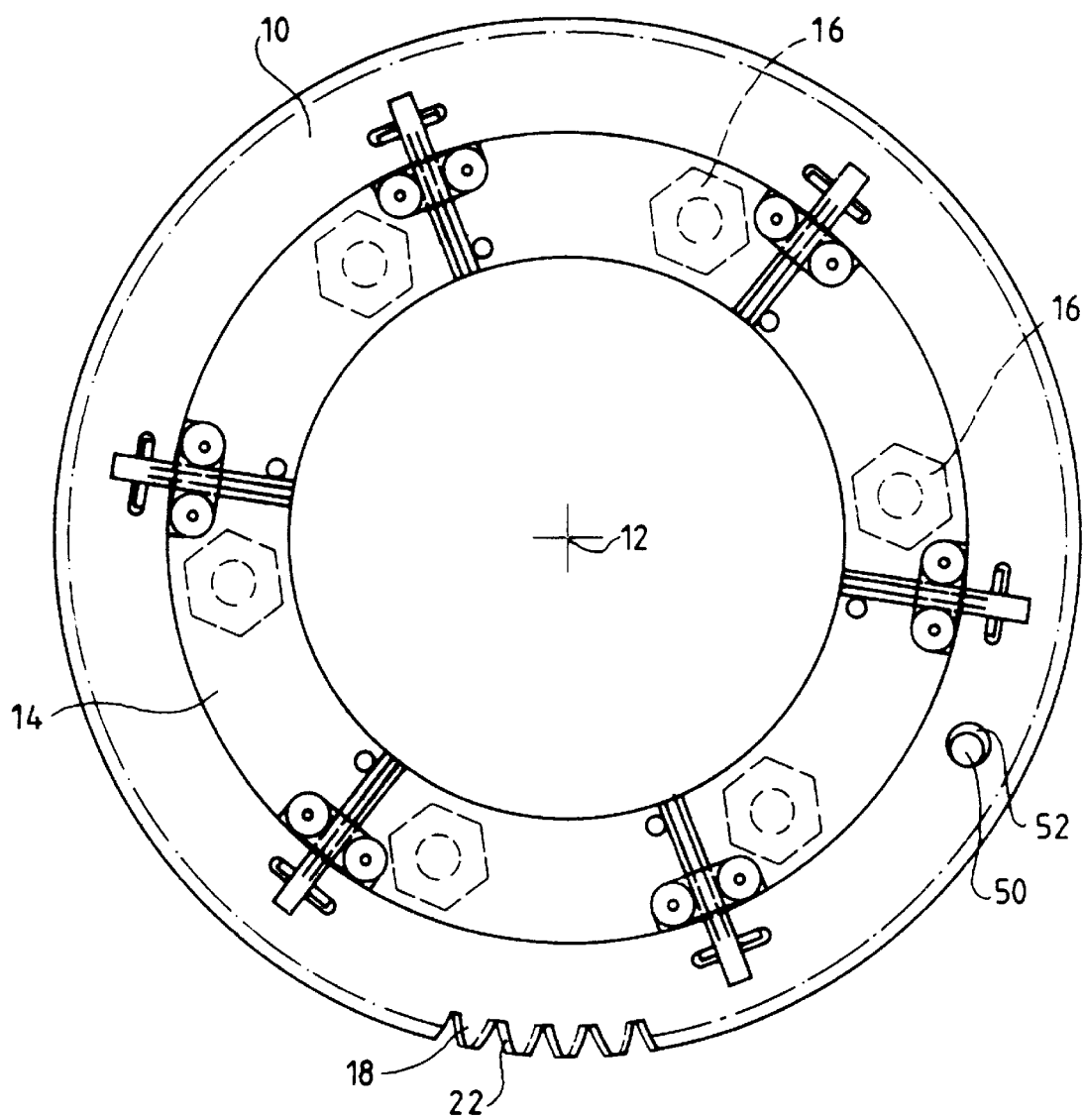
Figure 4:
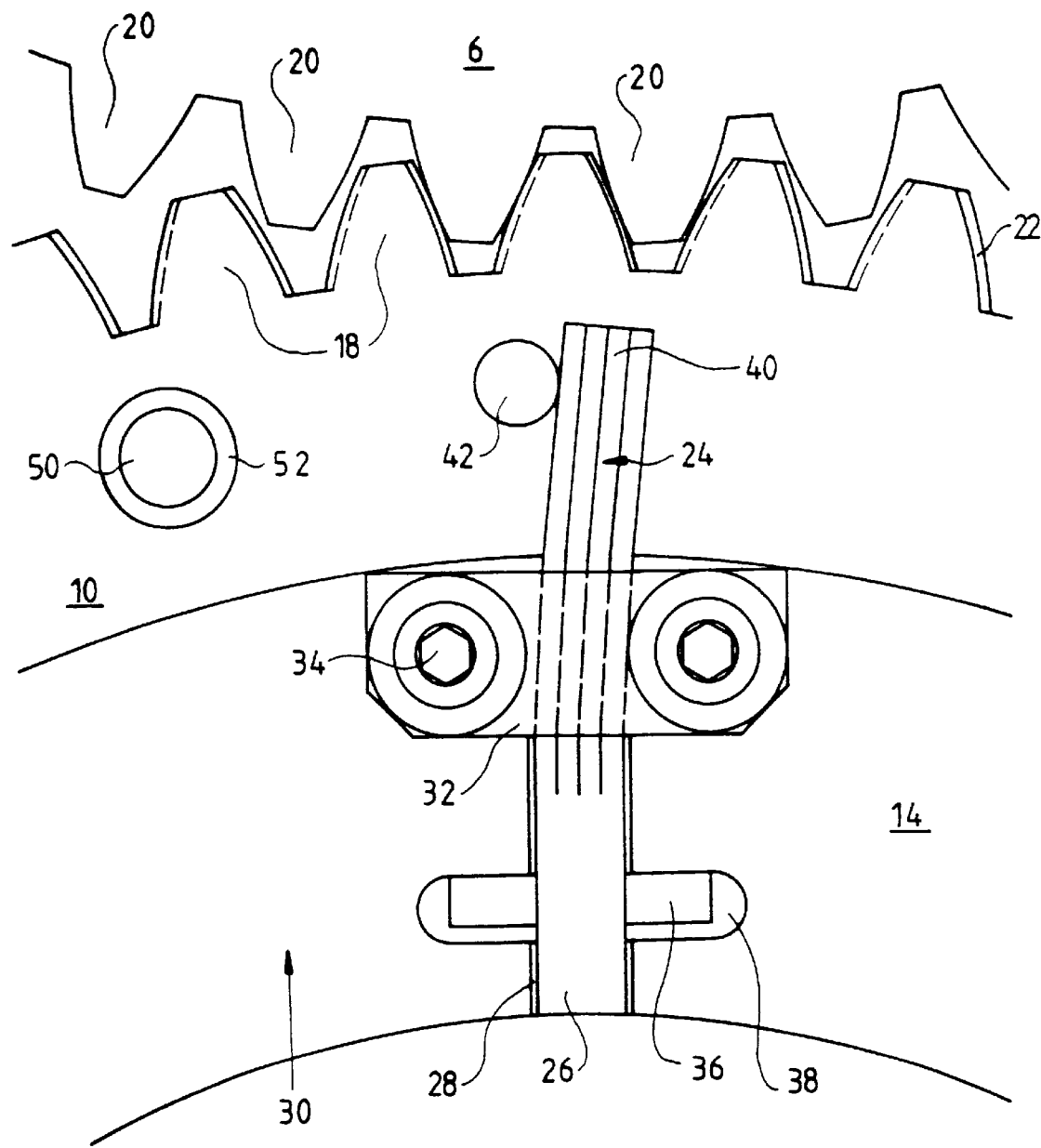
FIG. 4 shows an enlarged schematic front view of a supplementary gear and a leaf spring assembly acting on a support element formed at the supplementary gear according to an exemplary embodiment of the present invention.

For easily mounting the leaf spring assembly 24, the recess 28 formed in the sleeve-shaped projection 14 can be open in a direction towards the FIG. 2 end surface 30 of the sleeve-shaped projection 14, whereby the leaf spring assembly 24 can be axially secured by means of, for example, a bracket 32 and respective screws or bolts 34 mounted to the end surface 30 across the recess 28, as shown in FIGS. 2 to 4. Moreover, the leaf spring assembly 24 can be radially fixed in the radial recess 28 by means of, for example, a pin or bolt 36 extending through a respective hole formed in the first end portion 26 of the leaf spring assembly 24. As shown in FIGS. 3A and 4, the pin or bolt 36 can also be received in a recess 38 which can, for example, open towards the end surface 30 of the sleeve-shaped projection 14. Thus, the leaf spring assembly 24, together with the pin or bolt 36, can easily be mounted and dismounted by removing the bolts 34 and the bracket 32. Accordingly, the leaf spring assembly 24 can easily be replaced by a leaf spring assembly having different properties, such as a leaf spring having a different stiffness or spring characteristic. The apparatus can therefore be easily adapted to different machine types or working conditions.

In an exemplary embodiment of the invention, a second end portion 40 of the leaf spring assembly 24 engages a support element 42 formed at the supplementary gear 10. As shown in detail in FIG. 4, the support element 42 can, for example, be a pin or bolt extending sidewardly from the supplementary gear 10. In this embodiment of the invention, the support element 42 has a length which is of about the same size as the depth of the leaf spring assembly 24 (see FIG. 2).

Although the leaf spring assembly 24 is shown to be mounted for driving connection to the first gear 2, those skilled in the art will appreciate that the invention is not limited to such an embodiment. For example, the first end portion 26 of the leaf spring can be mounted (e.g., fixedly mounted) to the supplementary gear 10 in a manner similar to that described herein with respect to mounting of the first end portion to the sleeve-shaped projection. An exemplary mounting is shown in FIG. 3B wherein elements similar to those of FIG. 3A are shown. In FIG. 3B, the support element 42 is mounted with respect to the first gear (e.g., the support element 42 is mounted on sleeve-shaped projection 14). Further, relative widths of the supplementary gear 10 and the sleeve-shaped projection 14 are modified in the FIG. 3B embodiment. That is, the width of the supplementary gear 10 extends beyond the sleeve-shaped projection 14 in FIG. 3B so that the second end portion 40 of the leaf spring assembly is positioned beyond an outer surface of the sleeve-shaped projection 14, or in a recess thereof.

As shown in FIG. 4, the second end portion 40 of the leaf spring assembly 24 can be bent out of its radial zero position (i.e., a vertical position in FIG. 4) by a distance (for example, about 0.1 to 2.5 mm), when the apparatus 1 is assembled, thereby applying a force to the support element 42 for biasing the supplementary gear 10 and the first gear 2 to rotate in opposite directions. In other words, after the apparatus 1 has been assembled, the biasing force provided by the bent leaf spring assembly 24 presses the teeth 18 of the supplementary gear 10 against one side of the teeth 20 of the second gear 6, and at the same time presses the teeth 22 of the first gear 2 against the other side of the teeth 20 of the second gear 6, thereby preventing backlash between the first gear 2 and the second gear 6. In accordance with exemplary embodiments, even though distances between gear centers (e.g., the distance between the rotational axis of the first gear 2 and the second gear 6 in FIG. 1) may change, the bias force generated to cause the first gear 2 and the supplementary gear 10 to rotate in opposite directions also operates to eliminate any backlash or gap which may result from the variations in the gear center distances. As such, exemplary embodiments of the present invention also reduce and/or eliminate backlash or gaps due to variations of gear center distances.

Figure 5:
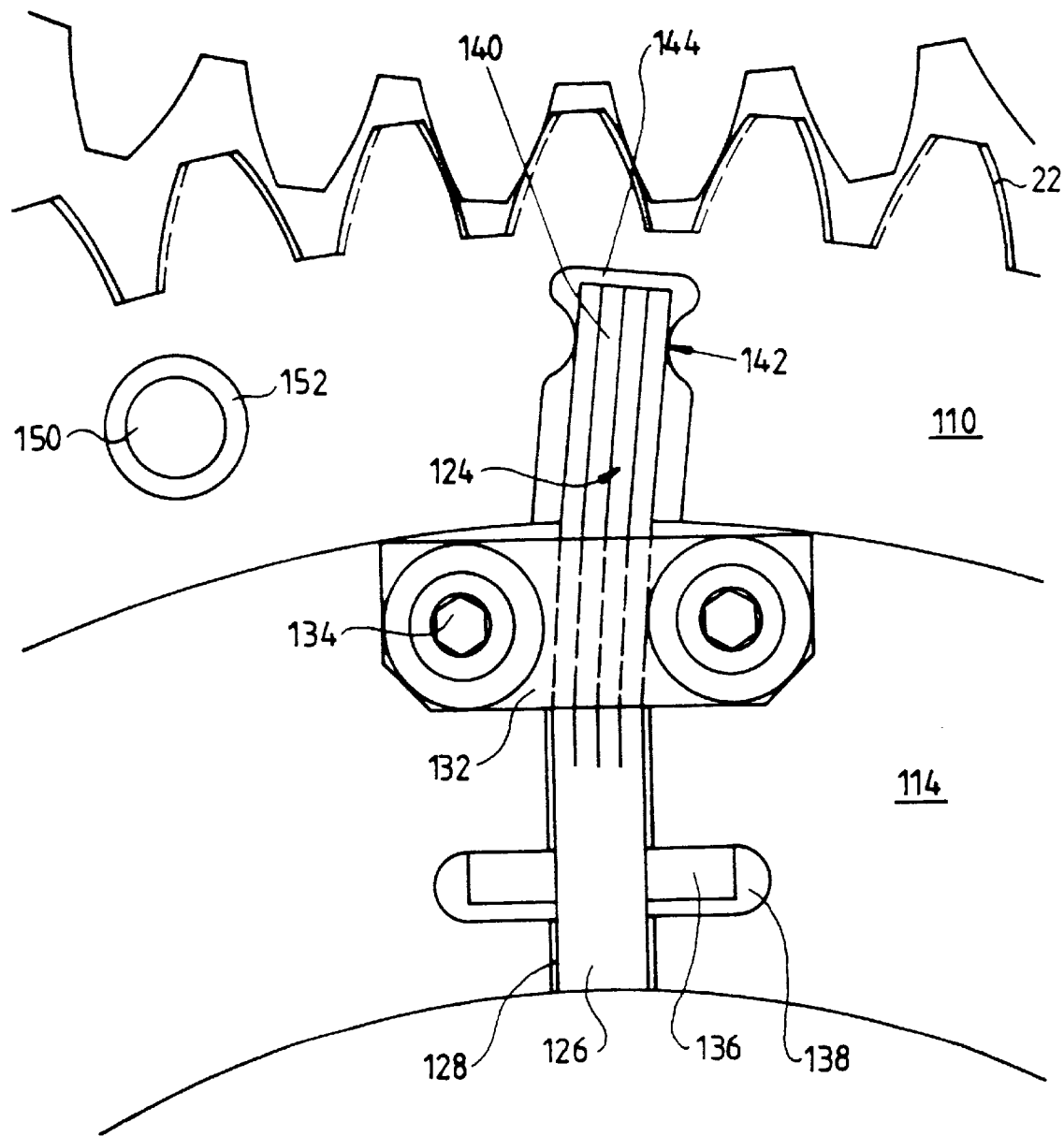
FIGS. 5 shows a further exemplary embodiment of an anti-backlash apparatus according to the present invention in which the leaf spring assembly is arranged within a recess formed inside the supplementary gear.

In a further exemplary embodiment of the invention, shown in FIG. 5, a second end portion 140 of a leaf spring assembly 124 is arranged in a recess 144 formed directly in a supplementary gear 110, for engaging a support element 142 formed in the supplementary gear. In the embodiment shown in FIG. 5, elements which are equivalent to elements of the embodiments shown in FIGS. 1 to 4 are indicated by reference numerals increased by 100. In the FIG. 5 embodiment of the invention, a first end portion 126 of the leaf spring assembly 124 is also arranged in a recess 128 formed in the body of a sleeve-shaped projection 114 mounted to the first gear 2.

In the FIG. 5 embodiment of the invention, the recess 128 is not arranged axially beside the supplementary gear 110, but is arranged immediately underneath the body of the supplementary gear 110. In the same way as described above, the leaf spring assembly 124 of this embodiment can be radially secured by, for example, a bolt or pin 136 extending through the first end portion 126 of the leaf spring assembly 124, which bolt 136 is arranged in a recess 138 formed in the body of the sleeve-shaped projection 114. The recess 138 for the bolt 136 and the recess 128 for receiving the first end portion 126 of the leaf spring assembly 124 also open in a direction towards the end surface of the sleeve-shaped projection 114. Moreover, the leaf spring assembly 124 can be axially secured in the recess 128 by means of a bracket 132 and respective bolts 134, as described in the embodiment of FIGS. 1 to 4, so that the leaf spring assembly 124 together with the bolt 136 for radially securing the leaf spring assembly, can easily be mounted and dismounted.

In order to prevent the supplementary gear 10 of FIGS. 1–4 and the supplementary gear 110 of FIG. 5 from freely rotating due to the forces applied by the bent leaf spring assembly 24, 124, when the first gear 2 and the supplementary gear 10, 110 are separated from each other (for example, in the event of a web-break in a web-fed rotary printing press, when the torn paper web wraps around the blanket cylinder and separates the blanket cylinder from the plate cylinder), a further pin 50 of FIGS. 3A and 4, or 150 of FIG. 5 can be provided at the first gear 2 extending from the side wall of the first gear 2 into a further recess 52, 152 respectively formed in the supplementary gear 10, 110. The recess 52, 152 can, for example, be circular or elliptical in shape.

Although the invention has been described with respect to one leaf spring assembly, any number of leaf spring assemblies can be used. For example, there can also be provided two, three, four or more leaf spring assemblies 24, 124. In exemplary embodiments where an even number of leaf spring assemblies are used, the leaf spring assemblies can be arranged about a center of the sleeve-shaped projection 14 (i.e., a center which corresponds to the rotational axis 12 of the first gear 2) in radially opposed couples, or pairs. Such an arrangement reduces or eliminates the development of composite torques due to all leaf spring assemblies which would tend to rotate the supplementary gear 10, 110 about axes perpendicular to the rotational axis of the first gear. That is, an arrangement of the leaf spring assemblies in radially opposing pairs results in any torque developed about axes perpendicular to the rotational axis of the first gear 2 being counteracted and eliminated.

Six leaf spring assemblies are shown in the exemplary FIG. 3A embodiment, which are, for example, spaced in equal circumferential distances from each other around the sleeve-shaped projection 14, 114. As such, the biasing forces for rotating the supplementary gear 10, 110 with respect to the first gear 2 can easily be reduced or multiplied, and the size of the biasing force can easily be adapted to different machine types and/or working conditions. For example, adaptation of the biasing force can be achieved by, for example, simply omitting one, two or more leaf spring assemblies 24, 124. Further, the biasing force can be altered by varying (i.e., increasing or decreasing) the number of leaf springs of each leaf spring assembly (for example, from four leaf springs for each of the six assemblies shown in FIG. 3A to six, seven or any number of leaf springs).

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalents thereof are intended to be embraced therein.

What is claimed is:

1. A rotary printing press comprising:

a supplementary gear rotatably mounted adjacent to a plate cylinder gear and rotatable about a rotational axis of the plate cylinder gear, teeth of the supplementary gear being in meshing engagement with teeth of a blanket cylinder gear;

a support element formed on at least one of the plate cylinder gear and the supplementary gear; and a leaf spring assembly having a first end portion extending substantially radially with respect to the rotational axis of the plate cylinder gear, a second end portion of the leaf spring assembly being bent out of its zero-position and engaging the support element to apply force to the support element which biases the supplementary gear and the plate cylinder gear to rotate in opposite directions.

2. Apparatus for preventing backlash between the meshing teeth of a first gear and a second gear in a rotary printing press, comprising:

a supplementary gear rotatably mounted adjacent to a first gear and rotatable about a rotational axis of the first gear, teeth of the supplementary gear being in meshing engagement with teeth of a second gear;

a support element formed on at least one of the first gear and the supplementary gear; and a leaf spring assembly having a first end portion extending substantially radially with respect to the rotational axis of the first gear, a second end portion of the leaf spring assembly being bent out of its zero-position and engaging the support element to apply force to the support element which biases the supplementary gear and the first gear to rotate in opposite directions.

3. Apparatus according to claim 2, wherein the support element further comprises:

a pin projecting sidewardly from the supplementary gear, the leaf spring assembly being arranged outside of the supplementary gear.

4. Apparatus according to claim 2, wherein the supplementary gear further comprises:

a recess into which the second end portion of the leaf spring assembly extends, the support element being formed at a sidewall of the recess.

5. Apparatus according to claim 4, further comprising:

a pin extending from a sidewall of the first gear into a second recess formed in the supplementary gear for preventing free rotation of the supplementary gear when meshing engagement between the second gear with at least one of the first gear and the supplementary gear is interrupted.

6. Apparatus according to claim 2, wherein the supplementary gear further comprises:

a central recess for receiving a sleeve-shaped coaxial projection of the first gear, an inner diameter of the central recess and an outer diameter of the sleeve-shaped coaxial projection being such that the supplementary gear is rotatably supported on the sleeve-shaped coaxial projection and is radially immovable with respect to the rotational axis of the first gear.

7. Apparatus according to claim 6, wherein the first end portion of the leaf spring assembly is formed for receipt in a radially extending recess formed in the sleeve-shaped coaxial projection.

8. Apparatus according to claim 7, wherein the first end portion of the leaf spring assembly further includes a hole, the leaf spring assembly being radially secured in the radially extending recess by a pin extending through another hole formed in the sleeve-shaped coaxial projection and the hole formed in the first end portion of the leaf spring assembly.

9. Apparatus according to claim 8, wherein the sleeve-shaped coaxial projection is mounted to the first gear by means of bolts.

10. Apparatus according to claim 9, wherein the leaf spring assembly further includes:

at least two single leaf springs fixedly mounted together at the first end portion.

11. Apparatus according to claim 7, further comprising:

a bracket for axially securing the leaf spring assembly in the radially extending recess.

12. Apparatus according to claim 2, further comprising:

a pin extending from a sidewall of the first gear into a recess formed in the supplementary gear for preventing free rotation of the supplementary gear when meshing engagement between the second gear with at least one of the first gear and the supplementary gear is interrupted.

13. Apparatus according to claim 12, wherein the recess of the supplementary gear has an elliptical shape.

14. Apparatus according to claim 13, wherein the leaf spring assembly further includes:

at least two single leaf springs fixedly mounted together at the first end portion.

15. Apparatus according to claim 2, wherein the leaf spring assembly further includes:

at least two single leaf springs fixedly mounted together at the first end portion.

16. Apparatus according to claim 2, further including:

a plurality of additional leaf spring assemblies, each having first end portions fixedly mounted to the first gear and extending substantially radially with respect to the rotational axis of the first gear, and having second end portions bent out of their zero positions and engaging the support element.

17. Apparatus according to claim 2, further including:

an even number of leaf spring assemblies, said even number of leaf spring assemblies being arranged in radially opposing pairs about said rotational axis.

* * * * *